US009460818B2

(12) United States Patent
Bergman

(10) Patent No.: US 9,460,818 B2
(45) Date of Patent: Oct. 4, 2016

(54) LOW PRESSURE REACTOR SAFETY SYSTEMS AND METHODS

(75) Inventor: Mark A. Bergman, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1114 days.

(21) Appl. No.: 13/425,985

(22) Filed: Mar. 21, 2012

(65) Prior Publication Data

US 2013/0251085 A1    Sep. 26, 2013

(51) Int. Cl.
*G21C 9/00* (2006.01)
*G21D 1/02* (2006.01)
*G21C 15/18* (2006.01)
*G21D 3/06* (2006.01)

(52) U.S. Cl.
CPC ............... *G21D 1/02* (2013.01); *G21C 15/18* (2013.01); *G21D 3/06* (2013.01); *G21C 2015/185* (2013.01); *Y02E 30/31* (2013.01)

(58) Field of Classification Search
CPC ....... G21C 15/18; G21C 15/182; F04F 5/00; F04F 5/14
See application file for complete search history.

(56) References Cited

U.S. PATENT DOCUMENTS

| | | | |
|---|---|---|---|
| 3,282,227 A * | 11/1966 | Nielsen | 417/167 |
| 3,935,063 A | 1/1976 | Dunckel | |
| 4,035,231 A * | 7/1977 | Ventre | 376/282 |
| 4,051,892 A | 10/1977 | Reinsch | |
| 4,440,719 A * | 4/1984 | Howard | 376/372 |
| 5,011,652 A | 4/1991 | Tominaga et al. | |
| 5,169,595 A | 12/1992 | Cooke | |
| 5,262,091 A * | 11/1993 | Narabayashi et al. | 261/21 |
| 5,349,616 A | 9/1994 | Nakayama et al. | |
| 6,912,263 B2 | 6/2005 | Dagard | |
| 7,154,982 B2 | 12/2006 | Gautier | |

FOREIGN PATENT DOCUMENTS

| | | |
|---|---|---|
| JP | 62017692 A | 1/1987 |
| JP | 63-061997 | 3/1988 |

(Continued)

OTHER PUBLICATIONS

Birgenheier et al. "Designing Steam Jet Vacuum Systems" Chemical Engineering, Jul. 1993.*

(Continued)

*Primary Examiner* — Jack W Keith
*Assistant Examiner* — Sharon M Davis
(74) *Attorney, Agent, or Firm* — Ryan Alley Intellectual Property Law

(57) ABSTRACT

A supplementary injection device is installed in a nuclear power plant to draw coolant and inject coolant using an entraining fluid. The injection device can be a venturi or other passive device operable at relatively low fluid pressure that draws coolant through suction at the venturi narrowing point and mixes the coolant with the fluid for injection. The injection device is operable with a known BWR design, where the device is attached to a steam connection to the main steam line of the reactor, a coolant connection drawing from suction lines to a suppression cool or condensate tank, and an outlet connection injecting into the main feedwater lines. In a BWR, the injection device is operable without electricity and at a wide range of pressures, even less than 50 pounds per square inch, to maintain coolant levels in the reactor.

18 Claims, 3 Drawing Sheets

(56) References Cited

FOREIGN PATENT DOCUMENTS

| JP | 63-075691 | 4/1991 |
| JP | 04-009798 | 1/1992 |
| JP | 04347400 A | 12/1992 |
| JP | 05-052984 | 3/1993 |
| JP | 07-159581 | 6/1995 |
| JP | 09-304574 | 11/1997 |
| JP | 2001-004791 | 1/2001 |
| JP | 2004-536325 | 12/2004 |

OTHER PUBLICATIONS

"Ejectors and mechanical vacuum systems," Applied Process Design for Chemical & Petrochemical Plants, vol. 1, 1995, Chapter 6, pp. 343-398.*

Ketterer and Blathchley, "Steam Jet Vacuum Pumps," Schutte & Koerting.*

"Steam Jet Syphons" Venturi Jet Pumps, Ltd. Nov. 2008.*

Watanawanavet "Optimization of a High-Efficiency Jet Ejector by Computational Fluid Dynamics Software," Mesters Thesis, Texas A&M University, May 2005.*

R. W. Howard, High Pressure Injector System Development Plan for Feedwater Makeup to BWR Reactor Vessels and PWR Steam Generators, Oct. 1984.

P. Dumaz et al., Final Report of the Deepssi Project, May 2004.

Unofficial English translation of MX Office Action issued Apr. 23, 2014 in connection with corresponding MX Patent Application No. MX/a/2013/003220.

European Search Report in Corresponding EPO Application 13159200.8, Jan. 22, 2015.

Japanese Office Action in Corresponding JP Application 2013-055845, Jan. 13, 2015.

Unofficial English Translation of Japanese Office Action issued in connection with corresponding JP Application No. 2013-055845 on Oct. 6, 2015.

* cited by examiner

LOW PRESSURE REACTOR SAFETY SYSTEMS AND METHODS

BACKGROUND

FIG. 1 is a schematic diagram of a conventional commercial nuclear power reactor and various safety and cooling systems for the same. As shown in FIG. 1, a reactor 10 is positioned inside of a containment structure 1. During operation of reactor 10, liquid water coolant and moderator enters the reactor 10 through main feedwater lines 60 that are typically connected to a heat sink and source of fluid coolant, like a condenser cooled by a lake or river. Recirculation pump 20 and main recirculation loops 25 force flow of the liquid down through a bottom of the reactor 10, where the liquid then travels up through core 15 including nuclear fuel. As heat is transferred from fuel in core 15 to the liquid water coolant, the coolant may boil, producing steam that is driven to the top of reactor 10 and exits though a main steam line 50. Main steam line 50 connects to a turbine and paired generator to produce electricity from the energy in the steam. Once energy has been extracted from the steam, the steam is typically condensed and returned to the reactor 10 via feedwater line 60.

In the instance that recirculation pump 20 fails and/or liquid coolant from main feedwater lines 60 are lost, such as in a station blackout event where access to the electrical grid is cut off, reactor 10 is typically tripped so as to stop producing heat through fission. However, significant amounts of decay heat are still generated in core 15 following such a trip, and additional fluid coolant may be required to maintain safe core temperatures and avoid reactor 10 overheat or damage. In these scenarios, active emergency cooling systems, such as a Reactor Core Isolation Cooling (RCIC) turbine 40 or higher-output High Pressure Injection Cooling (HPIC) turbine, for example, operate using steam produced in core 15 by decay heat to drive turbines. Flow from main steam lines 50 is diverted to RCIC lines 55 in this instance. RCIC turbine 40 may then drive an RCIC pump 41, which injects liquid coolant from a suppression pool 30 or condensate storage tank 31 into main feedwater line 60 via RCIC suction line 35 and injection line 42. The injected liquid coolant maintains a coolant level in reactor 10 above core 15 and transfers decay heat away from core 15, preventing fuel damage. Saturated steam coming off RCIC turbine 40 can be condensed in suppression pool 30 by venting into suppression pool 30 via RCIC exhaust line 43.

RCIC turbine 40 typically requires a minimum steam pressure of 150 pounds/square inch in order to drive RCIC pump 41 to inject liquid coolant into main feedwater line 60 via injection line 42 and suction line 35. Pressure in main steam lines 50 from an outlet of reactor 10 will typically drop below 150 pounds/square inch after 8-20 hours of shutdown, at which time RCIC turbine 40 and other higher-pressure injection systems will not function. At this time, lower-pressure shutdown coolant injection systems (not shown) are activated and run off electricity from the electrical grid, or, in the station blackout event, emergency diesel generators. As long as an electricity source is available, lower-pressure injection systems can maintain safe temperatures and fluid level in core 15 until cold shutdown can be achieved or transient circumstances have ended and core 15 can resume generating power through fission. Regulatory bodies worldwide typically require these active systems, including RCIC systems and electricity-powered lower-pressure delivery systems, as the sole mechanisms to avoid core overheat and damage in transient scenarios involving loss of coolant and/or loss of offsite power.

SUMMARY

Example embodiments include methods and systems for cooling a nuclear reactor post-shutdown with a passive injection device connected to the reactor that injects a coolant into the reactor or a steam generator for the same using a local energetic fluid to drive the injection. Example embodiment injection devices work using fluids having pressure ranges with lower limits below those used in the operating nuclear reactor and those used to drive conventional coolant injection systems post-shutdown. The local energetic fluid may be supplied by the reactor itself; for example, in a Boiling Water Reactor (BWR) the passive injection device may use steam created by heating a coolant in the reactor. Similarly, in a Pressurized Water Reactor the passive injection device may use steam from a steam generator and inject coolant into the same. Example embodiment injection devices can passively inject coolant, without moving parts or electricity, using the local energetic fluid to suction and/or entrain the coolant and delivering the mixed fluid and coolant to the reactor. For example, an injection device may be a venturi that accelerates the fluid to create a pressure drop and draw the coolant into the fluid flow, which is then injected into the reactor. An example venturi may include a fluid inlet receiving the energetic fluid source, which then flows through a narrowing section to cause the acceleration and pressure drop, a coolant inlet at the narrowing section through which the coolant is drawn and entrained, and an outlet where the mix is injected into the nuclear reactor. For example, in a light water reactor, the coolant can be liquid water drawn from a suppression pool or other condensed source.

Example methods include installing a passive, low-pressure-compatible injection device between a coolant source and the reactor and supplying the same with an energetic fluid. For example, a venturi can be installed off an RCIC line connected to a main steam line of a BWR, with the venturi on an RCIC suction line where the venturi can draw water from a suppression pool or condensate tank and inject the water into the reactor using steam from the main steam line. Example methods may further include operating one or more valves to selectively operate the injection device by providing it with fluid connection to the various coolant and fluid sources. Such operation may be executed any time coolant injection into the reactor is desired, such as post-shutdown following a complete station blackout transient after reactor pressure has dropped to levels at which RCIC and other active injection systems cannot operate, in order to maintain coolant to the reactor for several days or weeks following such a transient.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
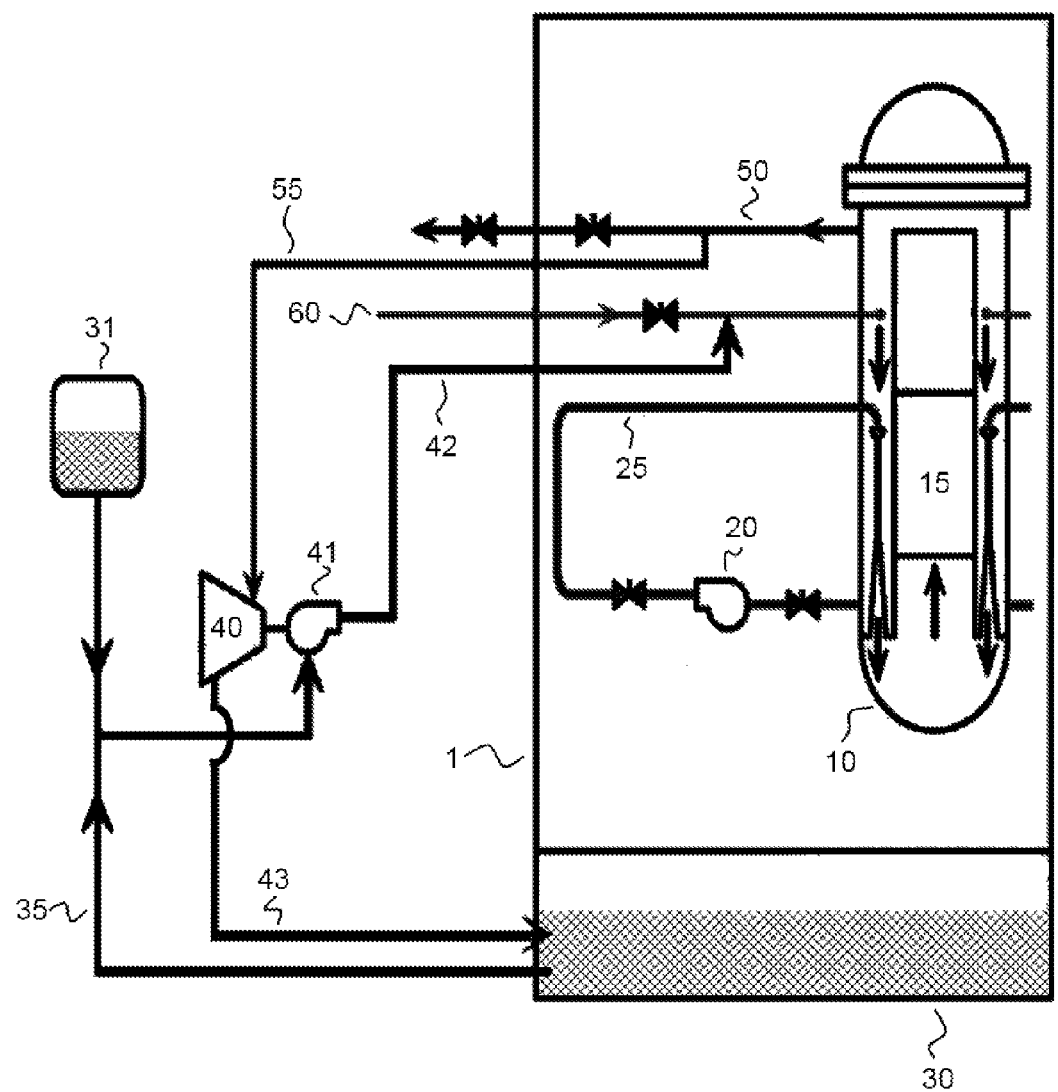
FIG. 1 is a schematic diagram of a conventional commercial nuclear reactor coolant injection system.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that plant emergency power systems, including local batteries and emergency diesel generators, may become unavailable in confounding combination with loss of access to the electrical grid during certain plant transients. That is, a transient event that cuts offsite power may also render unusable emergency diesel generators. In such a situation, active high-pressure injection systems, such as RCIC turbine 40 and pump 41, can provide fluid coolant flow to a reactor 10 to remove decay heat from the same for several hours; however, once reactor pressure falls below the high-pressure injection systems' operating pressure (typically within a day of the transient event), low-pressure injection systems must be initiated to provide liquid coolant makeup to reactor 10, which is still generating large amounts of decay heat. If emergency diesel generator and local power grid access are unavailable, conventional low-pressure injection systems cannot be operated, and battery-based systems are insufficient to prevent eventual loss of liquid coolant level in core 15 due to decay heat, greatly increasing the risk of fuel damage.

As such, Applicants have recognized an unexpected need for reliable reactor liquid coolant injection that is available without batteries or the electrical power grid starting almost a day after, and continuing several weeks after, a transient event that cuts both offsite power and local emergency power generation. Applicants have identified that using a steam source, such as low pressure steam from reactor 10 at below 150 pounds/square inch, may power some devices capable of injecting liquid coolant into reactor 10, at lower but sufficient flow rates to prevent core 15 from becoming uncovered or overheated for weeks, with proper device and system engineering. Example embodiment systems and methods discussed below address and overcome these problems identified by Applicants in unique and advantageous ways.

Figure 2:
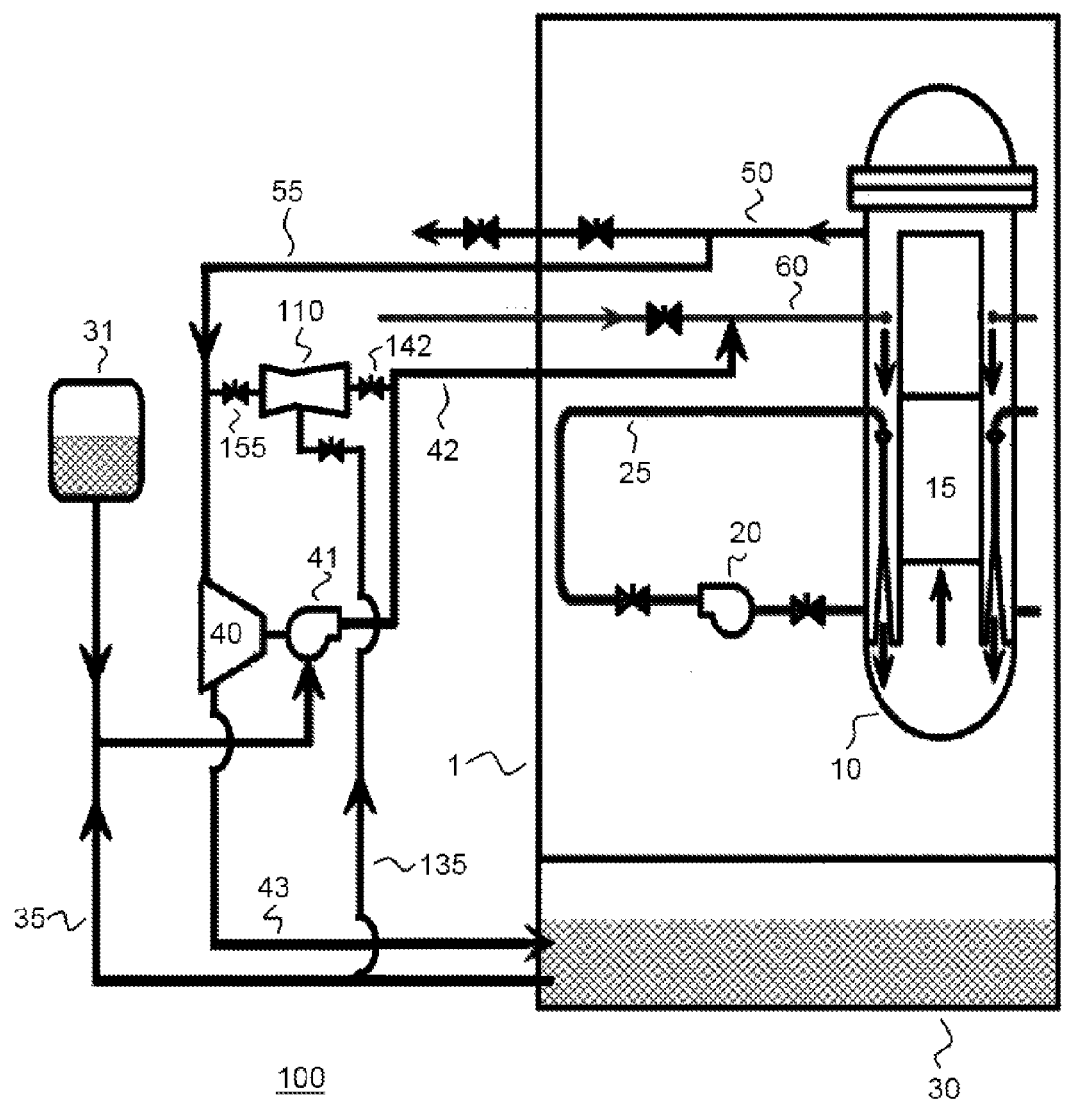
FIG. 2 is a schematic diagram of an example embodiment passive low pressure coolant injection system.

FIG. 2 is a schematic drawing of an example embodiment passive low-pressure injection system 100 useable in conventional and future water-cooled nuclear power plants. It is understood that although example embodiment 100 is shown using light water as a liquid coolant in a conventional BWR, other plant and coolant types are useable as example embodiments. Reference characters shared between FIGS. 1 and 2 label plant components that may be in existing systems, and whose redundant description is omitted.

As shown in FIG. 2, example embodiment system includes a low-pressure injection device 110 that is operable to inject coolant from a source, such as suppression pool 30 and/or condensate storage tank 31, into reactor 10. Low-pressure injection device 110 is operable at pressures below those required to operate conventional high-pressure systems, such as RCIC turbine 40, in order to provide parallel cooling to reactor 10 at lower pressures. Low-pressure injection device 110 may be operable at pressures where conventional high-pressure systems operate, additionally allowing low-pressure injection device 110 to supplement such higher-pressure systems.

Figure 3:
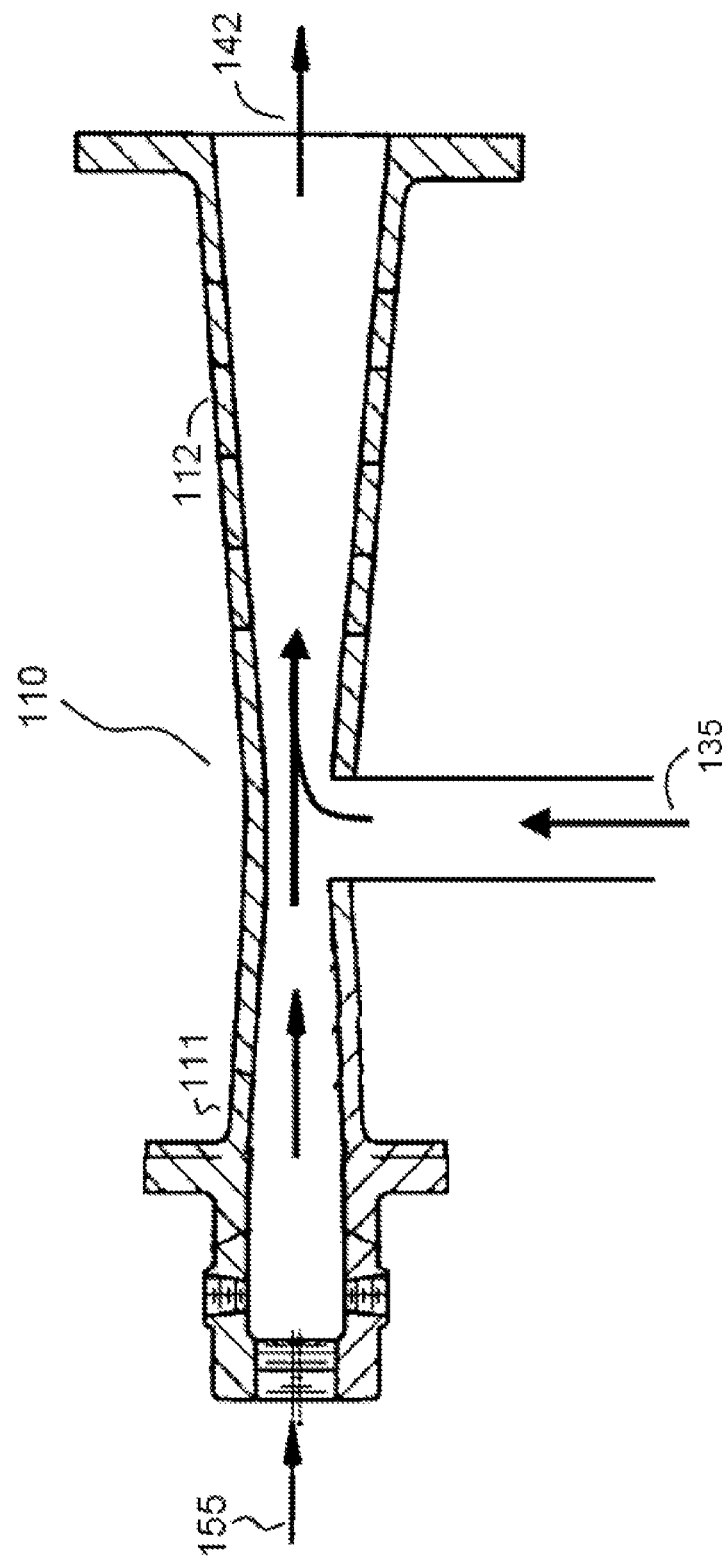
FIG. 3 is an illustration of an example embodiment venturi useable in example embodiment systems.

For example, low-pressure injection device 110 may be a venturi device that receives steam from reactor 10, passes the steam through a venturi that accelerates the steam and causes a suction/pressure drop, thereby drawing and entraining liquid coolant from suppression pool 30 and/or or condensate storage tank 31, and then injects the resultant steam-liquid mixture into reactor 10 to makeup liquid coolant volume of reactor 10. Such an example venturi tube for low-pressure injection device 110 is shown in FIG. 3. For example, as shown in FIG. 3, relatively lower-pressure steam from a reactor 10 can be routed into venturi 110 from main steam diversion line 155. In a narrowing section 111 of venturi 110, the steam may increase velocity with resultant pressure drop, or suction, under Bernoulli's principle. In this example, the suction draws liquid coolant from suction diversion line 135 into venturi 110, where the coolant is entrained in the steam flow through venturi 110. Venturi 110 may include a diffuser section 112 that decreases flow velocity and increases pressure of the resulting liquid coolant/steam flow to that necessary for injection into reactor 10 via injection diversion line 142, or to some other desired pressure and velocity for compatibility with example embodiment systems. The liquid coolant may also condense a significant portion of steam flow through venturi 110 when mixing, yielding even more liquid coolant for injection into reactor 10. Venturi 110 may be sized in a diameter and length and otherwise configured, such as in angle of narrowing section 111 and/or presence of diffuser section 112, to provide desired flow characteristics to reactor 10 given the arrangement, parameters, and anticipated transient conditions of example embodiment system 100 in which venturi 110 operates.

Venturi 110 generally includes few or no moving parts and may provide suction and liquid coolant entrainment/injection passively as long as a minimally pressurized steam flow from reactor 10 is connected to venturi 110. For example, venturi 110 may be operable to draw and entrain fluid from suppression pool 30/condensate tank 31 at about 150 to 50 pounds per square inch or less, well below an operating pressure of RCIC turbine 40. Similarly, venturi 110 may be operable at pressures well above 150 pounds per square inch to supplement or replace any RCIC turbine 40 and pump 41 or other high-pressure injection systems. Further, venturi 110 may have very few energy losses, permitting efficient energy transfer from pressurized steam flow to liquid coolant injection. For example, with typical decay heat generated by commercial nuclear reactors, venturi 110 may be able to reliably inject sufficient liquid coolant to maintain coolant level above core 15 for several days or weeks before pressure in reactor 10 would be inadequate to operate venturi 110 and maintain required liquid coolant injection. Additionally, venturi 110 may be relatively simple and reliable, requiring no outside power or moving parts, so as to present very little opportunity for failure, even in transients involving emergency conditions and total station blackout, with easy installation and fabrication.

Although the example embodiment of FIG. 3 shows a particular venturi for low-pressure injection device 110, it is understood that other reliable low-pressure injection devices may be used instead of a venturi in example embodiment system 100. For example, low-pressure injection device 110 could be a choke plate, a nozzle, aspirator, and/or any other device that can reliably and passively drive liquid coolant into reactor 10 using only lower-pressure steam.

In an example embodiment coolant system 100, low-pressure injection device 110 is connected to a steam source, a liquid coolant source, and a reactor inlet to deliver entrained liquid coolant. These sources and connections may be achieved in several flexible ways, depending on the arrangement of a reactor and associated coolant systems. As shown in FIG. 2, for example, low-pressure injection device 110 can be connected to a main steam line 50 of reactor 10, via RCIC line 55 and an isolated main steam diversion line 155. Suction diversion line 135 may connect low-pressure injection device 110 to liquid coolant sources such as suppression pool 30 and/or condensate makeup tank 31 via conventional suction line 35. Low-pressure injection device 110 may inject its entrained liquid coolant back into injection line 42 via injection diversion line 142 for delivery to reactor 10 through main feedwater line 60. Any or all of main steam diversion line 155, suction diversion line 135, and injection diversion line 142 may include valves that permit isolation or activation of low-pressure injection device 110 through automatic or manual valve activation. For example, simple swing check valves may be used in main steam diversion line 155, suction diversion line 135, and/or injection diversion line 142 to reliably operate low-pressure injection device 110 when desired.

Of course, a venturi or other low-pressure injection device 110 may be placed in any configuration with access to a steam source, a liquid coolant source, and injection to reactor 10 in order to provide reliable low-pressure coolant injection in example embodiment system 100, in approximate parallel with conventional active emergency cooling systems. For example, low-pressure injection device 110 could be positioned directly between a heat sink and liquid coolant source, such as a river or lake, and an inlet of reactor 10 with access to any steam source in order to drive liquid coolant into reactor 10. Similarly, low-pressure injection device 110 could be positioned in direct parallel with RCIC turbine 40 and pump 41 and operate simultaneously with these or other systems, and/or be switched to exclusive use upon failure of these or other systems.

Example embodiments and methods thus being described, it will be appreciated by one skilled in the art that example embodiments may be varied and substituted through routine experimentation while still falling within the scope of the following claims. For example, although example embodiments are described in connection with BWRs using light water as a liquid coolant in nuclear power plants, it is understood that example embodiments and methods can be used in connection with any reactor cooling system where energetic fluid input can be used to entrain and inject a coolant into the reactor or a heat sink/steam generator of the reactor, including heavy-water, gas-cooled, and/or molten salt reactors. For example, superheated helium coolant could be diverted from a pebble bed reactor output and into an example embodiment injection device such as an orifice plate or venturi and be used to passively draw and entrain colder helium or another fluid coolant for injection into the reactor with relatively low pressures to maintain core temperatures and/or coolant flow. Such variations are not to be regarded as departure from the scope of the following claims.

What is claimed is:

1. A coolant injection system for supplementing an RCIC system in a nuclear reactor, the system comprising:
   the nuclear reactor;
   a coolant source including a suppression pool;
   an injection device configured to suck a liquid coolant against gravity;
   the RCIC system including an RCIC turbine, an RCIC pump powered by the RCIC turbine, and an RCIC line connecting steam to the RCIC turbine from the nuclear reactor;
   a steam connection connecting steam from the RCIC line to the injection device before the RCIC turbine;
   a coolant connection connecting the liquid coolant from the suppression pool to the injection device; and
   an outlet connection connecting the steam and the liquid coolant to the nuclear reactor, wherein the injection device is configured to entrain the liquid coolant in the steam and inject the entrained liquid coolant and steam into the nuclear reactor, and wherein there are no pumps or turbines along the outlet connection between the injection device and the nuclear reactor.

2. The system of claim 1, wherein the steam is at less than 150 pounds per square inch pressure.

3. The system of claim 1, wherein the injection device is a venturi including a narrowing section configured to increase a velocity and reduce a pressure of the steam flowing through the narrowing section.

4. The system of claim 3, wherein the venturi connects to the coolant connection at the narrowing section so as to draw the liquid coolant into the venturi with the pressure.

5. The system of claim 3, wherein the venturi further includes a diffuser section configured to increase a pressure of the entrained liquid coolant and steam.

6. The system of claim 1, wherein,
the nuclear reactor is a light water reactor,
the RCIC line is a line connecting a main steam line of the reactor to the steam connection,
the coolant connection is a line connecting the suppression pool of the reactor to the injection device, and
the outlet connection is a line connecting the injection device to a main feedwater line of the reactor.

7. The system of claim 6, wherein the suppression pool is below the reactor and below the injection device, and wherein the coolant connection is a line running upward from below a coolant level in the suppression pool to the injection device.

8. The system of claim 6, wherein the main steam line connects to a turbine with a generator to produce electricity, and wherein the steam connection diverts from the main steam line before the turbine.

9. The system of claim 6, wherein the steam connection includes a steam diversion line diverting from the RCIC line that diverts from the main steam line, and wherein the main feedwater line is connected to the reactor and a coolant source that provides only liquid water coolant.

10. The system of claim 1, wherein at least one of the steam connection, the coolant connection, and the outlet connection includes a swing check valve to control operation of the system.

11. The system of claim 1, wherein the injection device is configured to entrain a volumetric flow rate of the liquid coolant sufficient to maintain a liquid coolant level in the reactor when the reactor is generating only decay heat.

12. The system of claim 1, wherein the coolant is entirely below the injection device, and wherein the injection device is configured to entrain the coolant by suction up through the coolant connection.

13. The system of claim 1, wherein the coolant is entirely below the injection device, wherein the injection device is passive and includes no moving parts, and wherein the injection device is configured to draw the coolant up through the coolant connection to the injection device when the steam is at about 50 pounds per square inch of pressure.

14. The system of claim 1, wherein the coolant source is a reservoir holding liquid coolant with a top level entirely below the injection device, and wherein the coolant connection connects between the injection device to below the top level in the reservoir.

15. The system of claim 14, wherein the injection device is a venturi, and wherein the coolant connection connects to the venturi at a narrowest portion of the venturi.

16. The system of claim 15, further comprising:
a main steam line connecting the reactor to a turbine with electrical generator, wherein the steam connection diverts from the RCIC line to the venturi.

17. The system of claim 16, wherein the reactor is in a shut down condition and provides steam that is at less than 150 pounds per square inch pressure in the reactor and the main steam line, and wherein the venturi is configured to entrain the liquid coolant in the steam and inject the liquid coolant and steam into the reactor.

18. A coolant injection system for providing coolant in a shutdown nuclear reactor, the system comprising:
a decay-heat driven system including a turbine, a pump, and a coolant source, wherein the turbine is configured to extract power from steam generated in the shutdown nuclear reactor to power the pump, and wherein the pump is configured to inject liquid coolant from the coolant source into the shutdown nuclear reactor under power from the turbine;
an injection device configured to entrain the liquid coolant in the steam at steam pressures below which the turbine cannot operate the pump, wherein the injection device is configured to entrain the liquid coolant in the steam without electrical power;
a steam connection connecting the steam from the shutdown nuclear reactor to the injection device, wherein the steam connection connects directly to the shutdown nuclear reactor and the injection device and consists only of piping and a valve controlling steam flow through the steam connection;
a coolant connection connecting the liquid coolant from the liquid coolant source to the injection device, wherein the injection device consists only of a venturi with the coolant connection connecting to the venturi at a narrowest flow area of the venturi, and wherein the coolant connection connects directly to the liquid coolant source and the injection device and consists only of piping and a valve controlling liquid water flow through the coolant connection; and
an outlet connection connecting the steam and the liquid coolant as entrained in the injection device to the nuclear reactor, wherein the outlet connection connects directly to the injection device and the shutdown nuclear reactor and consists only of piping and a valve controlling entrained steam and liquid water flow through the outlet connection.

* * * * *